United States Patent [19]

Kerscher et al.

[11] Patent Number: 5,830,544
[45] Date of Patent: Nov. 3, 1998

[54] NON-STICKY POLYESTER BOTTLES

[75] Inventors: Frederick C. Kerscher, Tallmadge; Charles L. Kern, North Canton, both of Ohio

[73] Assignee: Shell Oil Company, Houston, Tex.

[21] Appl. No.: 609,580

[22] Filed: Mar. 1, 1996

[51] Int. Cl.⁶ .............................. C08K 3/36; B29D 22/00

[52] U.S. Cl. .................... 428/34.5; 428/35.7; 428/36.92; 428/480; 428/542.8; 524/492; 524/513

[58] Field of Search ................................. 428/35.7, 36.6, 428/36.7, 36.9, 36.91, 36.92, 542.8, 480, 34.4, 34.5; 524/492, 442, 513; 264/512, 513, 532

[56] References Cited

U.S. PATENT DOCUMENTS

| | | | |
|---|---|---|---|
| 4,029,631 | 6/1977 | Bollen et al. | 523/100 |
| 4,486,378 | 12/1984 | Hirata et al. | 264/512 |
| 5,071,690 | 12/1991 | Fukuda et al. | 428/480 |
| 5,324,556 | 6/1994 | Hino et al. | 428/35.7 |
| 5,346,733 | 9/1994 | Dalgewicz, III et al. | 428/35.7 |
| 5,407,752 | 4/1995 | Fukuzumi et al. | 428/480 |
| 5,436,296 | 7/1995 | Swamikannu et al. | 525/166 |

*Primary Examiner*—Rena Dye

[57] ABSTRACT

A bottle preform and a molded bottle are prepared from a polyester composition comprising from about 0.0010 to about 0.0100 wt % amorphous silica. The bottle has a reduced tendency to stick to other bottles during packing and transportation.

10 Claims, No Drawings

NON-STICKY POLYESTER BOTTLES

BACKGROUND OF THE INVENTION

This invention relates to the manufacture of polyester bottles.

Polyethylene terephthalate is a polyester useful in preparing molded bottles to contain a wide variety of commercial liquids. It is desirable that such bottles have excellent strength and a high degree of clarity. Polyester bottles are typically filled with liquid at a different location than the site at which they are molded. The molded bottles must be packaged and shipped to the filling site. This is accomplished by a process termed "palletizing," in which bottles ejected from the mold and placed on a conveyor belt single-file are aligned and stacked in three-dimensional layers of hundreds of bottles, which are then wrapped together for transportation to the filling site. It has been found that polyester bottles tend to stick together during packing and unpacking, increasing the difficulty of palletizing at the molding plant and depalletizing at the filling plant. Spraying water on the bottles prior to packing has been found to reduce the stickiness of the polyester, but the effect disappears after evaporation of the water.

It is known to add about 2 ppt amorphous silica to polyester for use in molded trays for frozen microwavable foods. However, the amorphous silica causes the polyester to assume a hazy appearance, which is tolerable in trays but unacceptable for commercial bottles.

It is therefore an object of the invention to provide polyester bottles having both good clarity and a low tendency to stick together during and after molding.

BRIEF SUMMARY OF THE INVENTION

According to the invention, a bottle preform is prepared from a polyester composition which contains low levels of amorphous silica. The bottle prepared from such a preform has good clarity and a reduced tendency to stick to other bottles during packing and transportation.

DETAILED DESCRIPTION OF THE INVENTION

The invention preforms and bottles are molded from an aromatic polyester or copolyester. Such polyesters can be prepared by condensation polymerization of the esterification reaction product of one or more dicarboxylic acids and one or more alkylene diols. Alternatively, the polymerization starting material can be prepared by the transesterification reaction of one or more aromatic diesters with one or more aliphatic diols.

The currently preferred aromatic polyester for bottles is ethylene terephthalate, the product of polymerizing terephthalic acid and ethylene glycol. Ethylene terephthalate copolyesters can be prepared by including other diacids and/or diols in the condensation polymerization mixture. Alkylene diols such as 1,3-propanediol or 1,4-butanediol, and aromatic diacids (or alkyl esters thereof) such as isophthalic acid or 2,6-naphthalene dicarboxylic acid can be added to the polymerization reaction mixture to make bottle-grade polyethylene terephthalate copolyesters. Also suitable for bottles are polyethylene naphthalates prepared by reacting ethylene glycol and 2,6-naphthalene dicarboxylic acid (or 2,6-dimethyl terephthalate). The currently preferred polyester is polyethylene terephthalate made up of at least 90 percent ethylene terephthalate repeat polymeric units, with optional copolymerized ethylene naphthalate and/or ethylene isophthalate units.

The polyester composition for the invention preforms and bottles is preferably prepared by reacting the dicarboxylic acid(s) (or esters) and the diol(s) under melt condensation polymerization conditions, generally in the presence of a polycondensation catalyst such as antimony trioxide or an organomagnesium, at an elevated temperature and in a reduced pressure environment. The desired amount of amorphous silica can be added to the condensation reaction mixture. The reaction is generally carried out to the point at which the reaction product can be easily pelletized, and then the reaction product is extruded in the desired pellet, cube, chip or other small particle form.

By "amorphous silica" is meant non-crystalline silicon dioxide such as that available commercially as Syloid silicas® from W.R. Grace and Company.

The amorphous silica is added to the polyester in an amount within the range of about 0.0010 to about 0.0100 wt %, preferably about 0.0020 to about 0.0060 wt %, based on the weight of the polyester.

The amorphous silica-containing polyester is then solid-state polymerized to increase the polyester molecular weight. Solid-stating is carried out by heating the polyester in a suitable solid-state reactor to a temperature below the melting point under reduced pressure and/or inert gas flow for a period which can vary widely depending upon the particular polyester but will generally be greater than 7 hours, to achieve an intrinsic viscosity of about 0.70 to about 0.90 dl/g.

The solid-stated polyester will be formed into bottle preforms and then into bottles. A "preform" is a formed structure that can be expanded in a mold to form a bottle. The manufacture of preforms and bottles is known in the art, and any one of a number of suitable techniques can be used to prepare the preform and bottle.

In general, polyester bottles are prepared in blow-molding processes carried out by heating the preform above the polyester glass transition temperature, placing the heated preform into a mold of the desired bottle form, injecting air into the mold to force the preform into the shape of the mold, and ejecting the molded bottle from the mold onto a conveyor belt.

EXAMPLE 1

A series of polyethylene terephthalate bottles containing various levels of amorphous silica were tested for coefficient of friction (an indication of stickiness) and haze. Results are shown in Table 1.

TABLE 1

| Amorphous Silica (ppt) | Static Friction[a] | Kinetic Friction[b] | Haze[c] |
|---|---|---|---|
| 0 | 1.376 | 0.409 | 4.1 |
| 0.025 | 0.576 | 0.362 | 6.0 |
| 0.05 | 0.403 | 0.283 | 9.0 |
| 0.1 | 0.448 | 0.295 | 14.6 |
| 0.2 | not done | not done | 26.0 |

[a]Coefficient of friction as determined by ASTM D-1894-90
[b]Coefficient of friction as determined by ASTM D-1894-90
[c]Measured with a Hunterlab Colormeter As can be seen from the measured friction and haze values, levels of amorphous silica in the polyester from 0.0025 to 0.0050 wt % gave low friction with acceptable clarity.

We claim:

1. A polyester bottle preform in which the polyester comprises amorphous silica in an amount within the range of about 0.0010 to about 0.0100 wt %, based on the weight of the polyester.

2. The polyester bottle preform of claim 1 in which the polyester is polyethylene terephthalate homopolymer.

3. The polyester bottle preform of claim 1 in which the polyester is polyethylene terephthalate copolyester comprising polymerized units of ethylene isophthalate.

4. The polyester bottle preform of claim 1 in which the amorphous silica is present in an amount within the range of about 0.0020 to about 0.0060 wt %, based on the weight of the polyester.

5. A polyester molded bottle comprising amorphous silica in an amount within the range of about 0.0010 to about 0.0100 wt %, based on the weight of the polyester.

6. The polyester molded bottle of claim 5 in which the polyester is polyethylene terephthalate homopolymer.

7. The polyester molded bottle of claim 5 in which the polyester is polyethylene terephthalate copolyester comprising polymerized units of ethylene naphthalate.

8. The polyester molded bottle of claim 5 in which the polyester is polyethylene terephthalate copolyester comprising polymerized units of ethylene isophthalate.

9. The polyester molded bottle of claim 6 in which the amorphous silica is present in an amount within the range of about 0.0020 to about 0.0040 wt %, based on the weight of the polyester.

10. A process for reducing the tendency of molded polyethylene terephthalate bottles to stick together comprising adding amorphous silica to the polyethylene terephthalate in an amount within the range of about 0.0010 to about 0.0100 wt %, based on the weight of the polyester.

* * * * *